D. KILGOUR.
DRIFT PIN.
APPLICATION FILED AUG. 29, 1918.

1,311,128.

Patented July 22, 1919.

INVENTOR
David Kilgour.

BY
Fred J. Dieterich &Co
ATTORNEYS

UNITED STATES PATENT OFFICE.

DAVID KILGOUR, OF VANCOUVER, BRITISH COLUMBIA, CANADA.

DRIFT-PIN.

1,311,128.  Specification of Letters Patent.  Patented July 22, 1919.

Application filed August 29, 1918. Serial No. 251,977.

*To all whom it may concern:*

Be it known that I, DAVID KILGOUR, a citizen of the Dominion of Canada, residing at Vancouver, in the Province of British Columbia, Canada, have invented certain new and useful Improvements in Drift-Pins, of which the following is a specification.

This invention relates to a drift pin, such as is used to draw into alinement the bolt holes of pipe flanges or such metal plates as require to be bolted or riveted together.

This service is usually performed with a tapered drift pin, the smaller end of which is inserted in a partially alined pair of holes and may be used as a pry or lever, or may be driven by a hammer to pull the holes of the plate into alinement, that the bolts may be inserted in the other holes and secured. Frequently there is insufficient room to manipulate a long drift pin or apply a hammer. Moreover it is awkward under some circumstances for one man to hold the plate in the position of alinement while bolts are being inserted and secured.

It is to overcome these difficulties that the tool, which is the subject of this application, has been designed.

The invention is particularly described in the following specification, reference being made to the drawings by which it is accompanied, in which.

The tool comprises a steel pin having a parallel portion 2 slightly smaller than the bolt hole to which it is to be applied that it may pass easily into it. From this parallel portion 2 the pin is conically tapered at 3 to a smaller dimension 4 which is threaded to receive a nut 11. The larger or driving end of the pin is reduced slightly as at 5 and has a countersunk center 6. This is to prevent upsetting of the end of the parallel portion when a hammer is applied to it.

Figure 1:
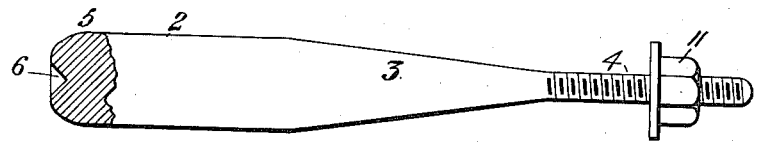
Figure 1 is a side view of the drift pin.
Figure 2:
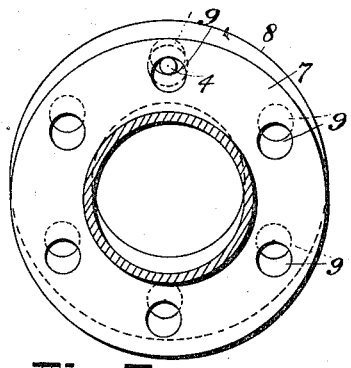
Figs. 2 and 3 illustrate the application of the tool.
Figure 3:
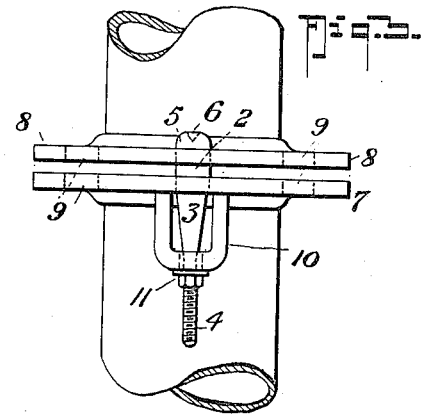

Figs. 2 and 3 show pipe flanges 7 and 8 which are out of alinement and to which the drift pin may be applied to enable the securing bolts to be passed into the bolt holes 9. The nut and washer of the pin being removed the threaded end 4 is passed through one of the partially alined bolt holes and the tapered portion 3 is gradually drawn through by the nut until the parallel portion 2 of the pin is in both flanges.

Figure 4:
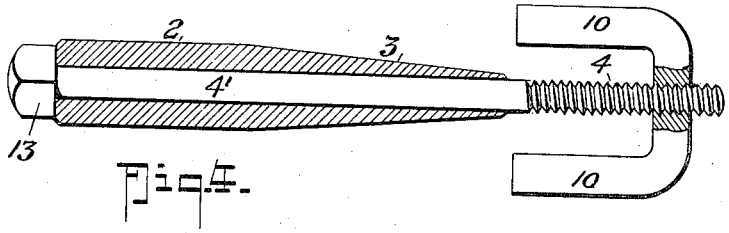
Figs. 4 and 5 show modifications in the construction of the pin.
Figure 5:
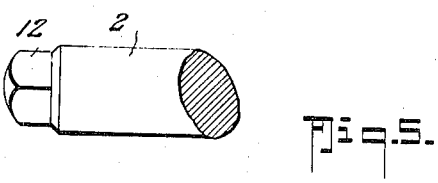

A bridge washer 10 or series of large washers is applied under the nut 11 to receive the larger dimension of the taper of the pin as the parallel portion 2 is drawn into the bolt hole. When this parallel portion 2 is drawn within both flanges, the bolts may be applied and tightened up in such bolt holes as are in alinement and the pin 2, 3 4 may be removed to another bolt hole, if necessary.

Where this tool is to be used in a position where a spanner cannot readily be applied to the nut 11 on the end of 4, the larger end of the pin may be paned as at 12 in Fig. 5, to receive a spanner that the pin 2, 3, 4 may be rotated in the nut 11, instead of rotating the nut on the pin. In this case the bridge washer 10, as shown in Fig. 2, may appropriately be threaded as a nut to receive the threaded end 4, as this bridge washer will hold against rotation:

Or, as shown in Fig. 4, the threaded portion 4 may form the end of a separate bolt 4' headed at 13 and passing axially through the parallel and tapered portion 2, 3 of the pin, in which case the threaded portion 4 may be rotated by means of the head 13 to draw the pin 2, 3 into the bolt hole of the flanges without rotating the pin.

The tool forms a convenient and useful one for the purpose for which it is designed as it not only powerfully rectifies the alinement of the bolt holes without injury to the same, but will retain them in the alined position and leave both hands of the operator free to introduce and tighten up the bolts.

Having now particularly described my invention, I hereby declare that what I claim as new and desire to be protected in by Letters Patent, is:—

1. In a tapered drift pin, a tapered body part, a cylindrical part projecting from each end of the body part in axial alinement with the same, the larger cylindrical projection having its surface smooth and the smaller cylindrical projection being threaded to receive a nut element which, in coöperating with the threaded part, enables the pin to be drawn into the bolt holes or plates to bring the same into alinement.

2. A tapered drift pin having a cylindrical portion projecting from the larger and smaller end of the taper in alinement with its axis, the smaller projecting end being formed by the end of a headed bolt which passes axially through the parallel and tapered portion of the pin and rotatable therein.

In testimony whereof I affix my signature.

DAVID KILGOUR.